Patented Nov. 11, 1941

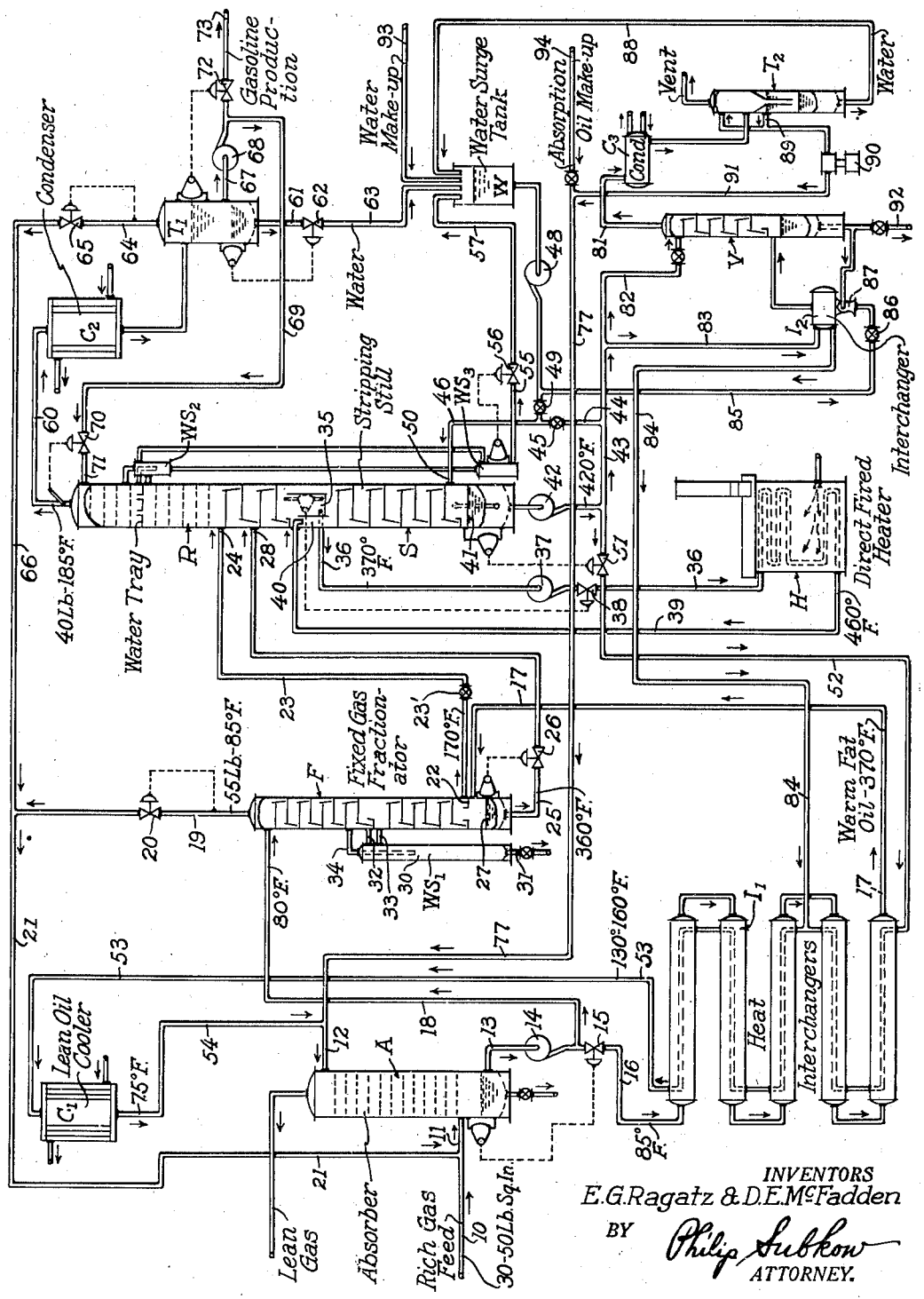

2,262,202

UNITED STATES PATENT OFFICE 2,262,202

NATURAL GASOLINE ABSORPTION AND DISTILLATION PROCESS

Edward G. Ragatz, San Marino, and Donald E. McFaddin, Alhambra, Calif., assignors to Union Oil Company of California, Los Angeles, Calif., a corporation of California Original application April 24, 1937, Serial No. 139,010. Divided and this application October 17, 1938, Serial No. 235,472

8 Claims. (Cl. 196—8)

This invention relates to absorption processes for recovering natural gasoline from natural gas. This application is a division of our copending application, Serial No. 139,010, filed April 24, 1937.

This invention relates particularly to a method for the recovery of natural gasoline from natural gas which comprises in general the steps of intimately contacting the rich natural gas with a suitable absorption oil to cause the natural gasoline constituents to be removed therefrom by solution in the absorption oil and producing thereby a lean natural gas free from natural gasoline and a rich absorption oil containing the natural gasoline constituents in solution. This is followed by distillation of the resultant rich absorption oil to remove and recover by condensation the natural gasoline constituents and to restore the absorption oil to a lean condition suitable for recycling and recontacting additional rich natural gas for the absorption of additional natural gasoline.

In the conventional method of carrying out this basic process, the heat for distillation of the rich absorption oil is applied to the system at a relatively low temperature plane by means of steam preheaters on the rich absorption oil stream between the interchangers and the still, and by additional steam reheaters or reboilers at the still, together with injection of open steam in the bottom of the still. In addition to this, separate steam heaters have been required in the fixed gas fractionators and the absorption oil reconditioning units where such apparatus has been employed in conjunction with the conventional absorption cycle equipment.

When direct fired heating of the absorption oil has been attempted without employing steam in the reboiler or in the fractionating equipment, an excessively high temperature considerably above 500° F. has been necessary to vaporize the desirable natural gasoline constituents from the absorption oil and this requires that larger interchanger surfaces be employed to make efficient use of the available residual heat.

In attempts to reduce the necessity for excessive interchanger surface area while at the same time employing direct fired heating, it has heretofore been necessary to provide separate and additional boiler facilities for supplying the steam requirements of the reboilers and for open steam injection into stills for reduction of the distillation temperatures.

This invention presents a process and apparatus wherein direct fired heating entirely supplants all steam generating units, yet employs distillation temperatures intermediate those usually associated with direct fired and steam operated systems. The process of this invention, therefore, partakes of the advantages of both the direct firing and steam distillation methods for the recovery of natural gasoline from the absorption oil, with substantially none of the disadvantages heretofore associated therewith.

According to the present invention the heat is not supplied by steam as the heating medium nor is heat supplied at a plurality of points in the system, but instead and in contrast with the conventional methods, the heat is supplied to the system at a single point only and at a moderately high temperature plane, but not over 500° F., by means of a direct fired heater. Also in contrast with conventional absorption cycle distillation systems, steam for aiding vaporization and reducing the maximum distillation temperatures in the various stills is not supplied by a separate boiler but is generated in the fractionating column by injection of a suitable quantity of water into a recirculated portion of the column bottoms utilizing the sensible heat of the oil for the required heat of vaporization of the water to form steam.

By the employment of a direct fired heater operating on a recirculated stream drawn off the side of the fractionating column, the temperature plane of the system may be raised above that ordinarily practicable with steam heating and to a degree where a single heat exchange between the fractionating column bottoms and the rich absorption oil is sufficient without additional direct heating, to impart all of the necessary heat to the column feed. Furthermore, employing a higher temperature plane such as is possible with direct fired heating makes it possible to recondition the absorption oil by distillation without imparting additional direct heat thereto. Thus the heat necessary to carry on the entire distillation process of the absorption system may be supplied through a direct fired heater at a single point in the system, and the stream required for the distillation is supplied without the necessity of separate boiler equipment.

When direct fired heating of the absorption oil has heretofore been attempted in the distillation equipment of absorption systems, trouble has been encountered with the formation of coke and gummy deposits in the tubes of the heater, often to the extent of abandonment of the direct fired method. These coke and gum-forming materials are believed to comprise largely asphaltic and tarry constituents of the crude oil which are carried over from the gas-oil separating traps in lines leading from the wells to the absorption plant. Oxidation products are also formed in the absorption oil by air which finds its way into the vacuum gas gathering system to be subsequently comprised and recirculated into the high pressure gas system and finally into the absorbers.

These gummy and tarry constituents upon contact with the tubes of the direct fired heater form carbonaceous deposits which necessitate frequent repairs and renewals, and the development of these detrimental carbonaceous deposits appears to be more acute in the direct fired heater than in steam heaters by reason of the higher tube surface temperatures and the associated higher contacting oil film temperature obtaining therein.

It has been found possible to overcome the before described difficulties of employing direct fired heating in absorption systems by employing in conjunction therewith an absorption oil reconditioning unit for the continuous or intermittent removal of such coke forming substances from the circulating absorption oil.

Another novel feature of this invention accordingly resides in the combination of direct fired heating and reconditioning of the absorption oil.

This invention also includes a method of conserving and increasing recovery of the desirable volatile gasoline constituents present in the rich absorption oil by employing a novel fixed gas fractionator for effecting a more efficient separation and elimination of the fixed gases from the rich absorption oil prior to its distillation in the stripping column.

The fixed gas fractionator employs a cold rich absorption oil reflux which reduces the load upon the distillation system over that which would be required where lean oil reflux is used. The fixed gas fractionator also employs a novel step of separating water from an intermediate section thereof.

Another novel and important feature of the fixed gas fractionator resides in a bottom tray reflux liquid draw off by means of which the heat input to the column thereabove is accurately and efficiently controlled.

Objects of this invention are, therefore, to present an absorption cycle employing a direct fired heating unit at a single point in the system and eliminating steam boilers and other auxiliary heating units, which makes it possible to reduce the size of heat interchanger equipment, to reduce the pumping equipment and necessary manifolding, and to increase the efficiency of the recovery of the desirable natural gasoline constituents from natural gas.

Other objects and novel features of the invention will be evident hereinafter.

In the drawing, which illustrates diagrammatically a preferred embodiment of the process and apparatus of the invention, A is an absorber for countercurrent contact of the rich gas feed with the lean absorption oil; $I_1$ is a heat interchanger in which the rich absorption oil from the absorber is heated in countercurrent heat exchange with hot lean oil from the fractionating column bottoms; F is a fixed gas fractionator containing trays of conventional design into which the heated fat absorption oil from the interchangers is introduced; S and R are stripping section and fractionating sections, respectively, of the fat oil fractionating column; H is a direct fired heater; $WS_1$, $WS_2$, and $WS_3$ are water separator units connected to the various fractionating columns; $C_1$ is a lean oil cooler; $C_2$ is a condenser for the overhead vapors from the absorption oil fractionating column; $T_1$ is a run down tank for the condensate from the absorption oil fractionating column; W is a water surge tank; V is an absorption oil reconditioning column; $I_2$ is an interchanger for heating absorption oil in the reconditioning unit; $C_3$ is a condenser for the overhead absorption oil vapors from the oil conditioning fractionating column V; and $T_2$ is a run down tank for the absorption oil condensate from the condenser $C_3$.

The process and operation of the invention is as follows:

The rich gas feed containing natural gasoline constituents enters the system through feed line 10 and is introduced through pipe 11 into the lower section of the absorber A from where it passes upward through the column in countercurrent contact with descending lean absorption oil which enters at the top of the absorber through line 12 at a temperature of approximately 75° F. As a result of the intimate contact between the lean absorption oil and the said rich natural gas, the natural gasoline constituents are dissolved and removed with the absorption oil from the bottom of the absorber at a temperature of approximately 80° F. through line 13 from whence it is forced by pump 14 through liquid level regulated control valve 15 and line 16 into the heat exchanger $I_1$. The rich absorption oil is heated in the interchanger $I_1$ by countercurrent indirect heat exchange with heated oil to a temperature of approximately 370° and is withdrawn from the heat interchanger through line 17 and is introduced into the bottom section of the fixed gas fractionator F where a substantial portion of the fixed absorbed gases and a portion of the natural gasoline constituents are vaporized. A small amount of water which becomes dissolved in the absorption oil through contact with the natural gas or from the water employed in the stripping still as described hereinafter, also is vaporized and the water vapor together with the fixed gases and vaporized natural gasoline constituents pass up through the fractionating trays in the fixed gas fractionator.

The said upward-passing fixed gas and natural gasoline vapors contacted in counter current with a quantity of the descending cool rich absorption oil which is a portion of the before mentioned oil withdrawn from the bottom of the absorber through line 18 which is introduced into the top of the fixed gas fractionator. This results in condensation of a major portion of the desirable natural gasoline fractions and the water vapor. The major proportion of the fixed gases remain uncondensed and are withdrawn from the top of the fixed gas fractionator through line 19 and pressure regulator valve 20 and recycled to the rich gas feed through the pipe 21.

Ordinarily when treating rich natural gas at a pressure of approximately 50 to 60 pounds per square inch, the solution of fixed gases and gasoline in the absorption oil is such as to require a fat oil reflux to the top of fixed gas fractionator which amounts in quantity to approximately ten percent of the total circulated absorption oil.

A novel feature of the fixed gas fractionator resides in the employment of a water separator $WS_1$ connected thereto at an intermediate section. This water separator has been found to be indispensable in maintaining the fixed gas fractionator operative, for contrary to expectations, it has been found that without such provision for water removal the above mentioned water which enters the system in solution in the absorption oil accumulates within the fixed gas fractionator in sufficient quantity to eventually raise the top temperature thereof to a degree where water vapor passes overhead and the efficient separation of the fixed gas from the natural gasoline constituents is no longer possible.

The water separator $WS_1$ comprises in brief a tank 30 with a bottom water draw off 31 into which all of the reflux condensate from the fractionator is introduced through pipe 32. The reflux condensate from which the water has been separated by settling is returned to the fixed gas fractionator at an intermediate point through pipe 33. Pipe 34 serves for pressure equalization and venting of gases from the water separator.

The employment of cool rich absorption oil as the reflux for the fixed gas fractionator is advantageous in reducing the load on the distillation system over that which would be necessary were lean absorption oil employed at this point.

Another novel feature of the fixed gas fractionator resides in the means whereby the heat input to the fixed gas fractionator trays is accurately regulated without loss or inefficient use thereof. The descending reflux liquid collects in the draw off tray 22 and that portion thereof which is not withdrawn through the line 23 and valve 23' overflows and thus falls back into the hot fat absorption oil bottoms 27 in the bottom of the fixed gas fractionator. That portion of the overflowing reflux liquid which is of substantially higher volatility than the bottoms material, is partially revaporized and returned in the form of vapors to the upper portion of the column. Return of these vapors conveys heat energy to the fractionating section. By adjusting valve 23' the relationship between the amount of reflux liquid withdrawn and that allowed to return to the column bottoms for revaporization is readily controlled and accordingly the heat input to the upper portion of the fixed gas fractionator is also controlled.

In the preferred method of operation of the fixed gas fractionator in conjunction with the natural gasoline fractionating column it has been found to be desirable to regulate the heat input to the fixed gas fractionator by the previously described method to maintain an overhead temperature of approximately 85-90° F. while producing overhead therefrom approximately 80% of the total liberated fixed gases, and producing overhead from the natural gasoline fractionating column the remaining 20% of the combined liberated fixed gases. Operation in this manner has been found to result in an optimum recovery of the natural gasoline constituents.

In accordance with the above described fixed gas fractionator operation a substantial portion of the reflux liquid in the fixed gas fractionator is withdrawn from the draw off plate 22 at a temperature of approximately 170° F. through the line 23, and is introduced at 24 into an intermediate point of the natural gasoline fractionating column R. The unvaporized portion of the rich absorption oil, together with the balance of the reflux liquid, is withdrawn from the bottom of the fixed gas fractionator at a temperature of approximately 360° F. through line 25, liquid level regulator valve 26 and introduced at 28 into an intermediate section of the fractionating column R.

The rich absorption oil streams from which a large proportion of the fixed gases have been removed in the fixed gas fractionator are thus introduced into intermediate adjacent sections of the fractionating column R through the pipes 24 and 28 and the oil descends through the column in countercurrent contact with rising heated vapors and falls into the collecting chamber 35. The partially denuded absorption oil is preferably totally withdrawn from the collecting chamber 35 through line 36 at a temperature of approximately 370° F. and is forced by pump 37 through the regulator valve 38 and through the heating coils in the direct fired heater H and returned at a temperature of approximately 460° F. through line 39 to the passage 40 leading to the top of the stripping section S. The thus heated partially denuded absorption oil passes downwardly in the stripping column S in countercurrent contact to rising heated vapors and steam and finally collects in a body in the bottom at 41. The denuded lean absorption oil is withdrawn from the bottom 41 of the stripping section S by means of pump 42 usually at a temperature of about 420° F. and a portion thereof is recirculated to the stripping column bottom through lines 43, 44, valve 45 and pipe 46. A constant quantity of water from the water surge tank W is introduced at an intermediate point into this recirculated stream of absorption oil bottoms by means of pump 48 through valve 49, and upon contact with the heated oil it vaporizes forming a mixture of steam and partially vaporized absorption oil upon entrance into the bottom of the column 50. Steam for stripping the absorption oil is thus supplied to the bottom of the stripping still S without the necessity of providing separate boiler equipment, by utilizing the sensible heat of the lean absorption oil to supply the heat of vaporization of the thus injected water.

Another portion of the denuded absorption oil withdrawn from the bottom of the stripping still S by means of pump 42 is forced through regulator valve 51 and pipe 52 into the heat interchanger $I_1$ and there passes in indirect heat exchange with the before mentioned fat absorption oil from the absorber A. The denuded lean absorption oil from which heat has been extracted in the heat interchanger $I_1$ passes through pipe 53 and through cooler $C_1$ and return at a temperature of approximately 75° F. through pipes 54 and 12 to the top of the before described absorber A to recontact additional rich natural gas.

It is usually important that the temperature of the lean oil withdrawn from the interchanger through pipe 53 be not over approximately 130-160° F. in order to avoid the formation of scale in the cooler coils $C_1$ where water is employed for cooling.

The fractionating column R is provided with an intermediate water separator $WS_2$ for removing the condensed steam from the column. The thus removed water, after draining into the regulator $WS_3$ passes therefrom through pipe 55, regulator valve 56 and pipe 57 to the water surge tank W.

The overhead natural gasoline vapors from the fractionating column R are withdrawn through pipe 60, condensed in condenser $C_2$ and the resultant condensate collected in the run down tank T₁, where separation of the remaining fixed gases, water and gasoline are effected by decantation. The water is withdrawn from the bottom through line 61, float control valve 62 and line 63 and returned to the before mentioned water surge tank W. The fixed gases are withdrawn from the top of the run down tank T₁ through pipe 64, back pressure regulator valve 65 and pipes 66 and 21 and return together with those fixed gases from the fixed gas fractionator to the rich gas feed inlet line 10. The separated natural gasoline contents is withdrawn from run down tank T₁ through side withdrawal pipe 67, and by means of pump 68 a portion thereof is returned as reflux through pipe 69 and temperature regulated valve 70 to the top of the fractionating column R at 71. The balance of the natural gasoline condensate is withdrawn to production through float control valve 72 and shipping line 73.

A small proportion of the denuded absorption oil may be constantly or intermittently withdrawn from the main stream leaving the bottom of the stripping column S and passes through line 82 to the top of the reconditioning column V through which it descends and collects in a body at the bottom. Heat sufficient to vaporize the absorption oil is supplied to a recirculated portion of the reconditioning column bottoms by means of the heat interchanger I₂ through which another portion of the hot denuded absorption oil circulates by way of pipes 83 and 84. Water is also injected into the recirculated absorption oil through pipe 85, valve 86 and injector 87 to aid distillation within the column.

That portion of the lean absorption oil which has passed through the heat exchanger I₂ and has given up a portion of its heat therein is returned by way of pipe 84 to an intermediate stage of the heat exchanger I₁ where it joins the main circulating body of absorption oil at a point where the temperatures are approximately the same.

The vaporized absorption oil and steam is withdrawn from the column V through line 81 and condensed in condenser C₃ and the resultant condensate collected in the run down tank T₂. The water and absorption oil condensate are separated in T₂ and the water withdrawn through line 88 and returned to the before mentioned water surge tank. The purified absorption oil condensate is withdrawn from T₂ through line 89 and returned to the system by means of pump 90 through pipe 91 and 77 to the lean absorption oil entering the absorber at 12. The bottoms from the column comprising resinous and asphaltic impurities removed from the vaporized absorption oil are withdrawn at 92.

Make up water is supplied to the water surge tank W through the make up water line 93 and make up absorption oil is supplied to the system through pipe 94.

The foregoing is descriptive of the preferred mode of operation, but variations in operating conditions may be possible. For example, the direct fired heater oil outlet temperature may vary between approximately 425 and 500° F. Any further departure from this temperature range results, in the case of further dropping of the temperature, in excessive steam demands by the stripping column to maintain the distillation rate at the reduced temperature. On the other hand a further increased temperature results in the necessity for excessively increased interchanger surface area. It has been found that the optimum heating conditions for economical consideration are thus attained within the temperature range of 425–500° F. and preferably at approximately 460° F.

It is to be understood that the foregoing is merely illustrative of a preferred embodiment of the apparatus and method of this invention and is not to be limited thereby but may include any method and apparatus within the scope of the claims.

We claim:

1. In a process for recovering natural gasoline from natural gas the steps comprising contacting absorption oil with rich natural gas to produce a fat absorption oil containing natural gasoline constituents and fixed gases in solution, heating a portion of said fat absorption oil, introducing said heated fat oil into the bottom of a fractionating column wherein natural gasoline constituents and fixed gases are vaporized, fractionating said vapors in counter current contact with the unheated portion of said fat absorption oil to condense the desirable natural gasoline constituent vapors, withdrawing overhead fixed gases substantially free from desirable natural gasoline constituents and withdrawing from said fractionating column fat absorption oil from which a substantial portion of the fixed gases has been removed.

2. In a process for recovering natural gasoline from natural gas the steps comprising contacting absorption oil with rich natural gas to produce a fat absorption oil containing natural gasoline constituents, fixed gas and water in solution, heating a portion of said fat absorption oil, introducing said fat oil into the bottom of a fractionating column wherein natural gasoline constituents, fixed gases and water are vaporized, fractionating said vapors in countercurrent contact with the unheated portion of said fat absorption oil to condense the desirable natural gasoline constituent vapors and water, withdrawing overhead from the fractionating column fixed gases substantially free from desirable natural gasoline constituents, withdrawing water from an intermediate section of said fractionating column and withdrawing fat absorption oil from the bottom portion of said fractionating column.

3. In a process for recovering natural gasoline from natural gas the steps comprising contacting absorption oil with rich natural gas to produce a fat absorption oil containing natural gasoline constituents and fixed gases in solution, heating a portion of said fat absorption oil, introducing said heated fat oil into the bottom of a fractionating column wherein natural gasoline constituents and fixed gases are vaporized, fractionating said vapors in countercurrent contact with the unheated portion of said fat absorption oil to condense the desirable natural gasoline constituent vapors, withdrawing overhead from the fractionating column fixed gases substantially free from desirable natural gasoline constituents, withdrawing a portion of the reflux liquid from a stage in the bottom portion of the fractionating column, withdrawing a portion of the reflux liquid from the bottom of the fractionating column and regulating the ratio of said withdrawn liquid reflux portions.

4. In a process for recovering natural gasoline from natural gas the steps comprising contacting absorption oil with rich natural gas to produce a fat absorption oil containing natural gasoline constituents and fixed gases in solution, heating a portion of said fat absorption oil, introducing said heated fat oil into the bottom of a fractionating column wherein natural gasoline constituents and fixed gases are vaporized, fractionating said vapors in countercurrent contact with the unheated portion of said fat absorption oil in the fractionating column to condense the desirable natural gasoline constituent vapors, withdrawing overhead from the fractionating column fixed gases substantially free from desirable natural gasoline constituents, withdrawing a portion of the reflux liquid from a stage in the bottom portion of the fractionating column, withdrawing another portion of the reflux liquid from the bottom of the fractionating column, regulating the ratio of said withdrawn liquid reflux portions, introducing said withdrawn reflux portions into adjacent intermediate stages of a second fractionating column, and fractionating the resultant vapors in said second fractionating column to produce overhead vapors of the desirable natural gasoline constituents relatively free of fixed gases.

5. In a process for recovering natural gasoline from natural gas the steps comprising contacting absorption oil with rich natural gas to produce a fat absorption oil containing natural gasoline constituents in solution, introducing said fat absorption oil into a fractionating column and vaporizing a portion of the natural gasoline constituents in countercurrent contact with heated vapors and steam, withdrawing and heating the resultant partially denuded absorption oil and returning same to a stripping section in said column, withdrawing lean absorption oil from said stripping section, introducing water into a portion of said withdrawn lean oil, and returning the resultant oil and water mixture to said stripping section to aid vaporization of natural gasoline constituents from the absorption oil, commingling the vapors from the stripping section with those in the fractionating column and withdrawing overhead vapors of natural gasoline constituents.

6. In a process for recovering natural gas wherein the heat is supplied to the system by direct fired heating at one point only in the system, the steps comprising contacting cool lean absorption oil with rich natural gas to produce fat absorption oil containing natural gasoline constituents and fixed gases in solution, heating said fat oil by indirect heat exchange with hot lean absorption oil, vaporizing and separating fixed gases from said heated fat oil, introducing fat oil from which fixed gases have thus been removed into a vaporizing zone in a fractionating column to vaporize and separate natural gasoline constituents, withdrawing and heating partially denuded oil from which a portion of the natural gasoline constituents have been removed, by direct firing in a still, introducing said heated partially denuded oil into a stripping zone to remove additional natural gasoline constituents and to produce a hot lean absorption oil, withdrawing said hot lean absorption oil, passing a portion of said hot lean oil in the first mentioned indirect heat exchange with the said cool fat oil, passing another portion of said hot lean oil in direct heat exchange with water to form steam and returning said portion of lean oil and steam to said stripping column.

7. In a process for recovering natural gasoline from natural gas wherein the heat is supplied to the system by direct fired heating at one point only in the system, the steps comprising contacting cool absorption oil with rich natural gas to produce fat absorption oil containing natural gasoline constituents and fixed gases in solution, heating said fat oil by indirect heat exchange with hot lean absorption oil, vaporizing and separating fixed gases from said heated fat oil, introducing fat oil from which fixed gases have thus been removed into a vaporizing zone in a fractionating column to vaporize and separate natural gasoline constituents, withdrawing and heating partially denuded oil from which a portion of the natural gasoline constituents have been removed, by direct firing in a still, introducing said heated partially denuded oil into a stripping zone to remove additional natural gasoline constituents and to produce a hot lean absorption oil, withdrawing said hot lean absorption oil, passing a portion of said hot lean oil in the first mentioned indirect heat exchange with the said cool fat oil, passing another portion of said hot lean oil in direct heat exchange with water to form steam and returning said portion of lean oil and steam to said stripping column, and passing still another portion of said hot lean oil in indirect heat exchange with lean absorption oil to vaporize and purify the same.

8. In a process for recovering natural gasoline from natural gas wherein the heat is supplied to the system by direct fired heating at one point only in the system, the steps comprising contacting cool absorption oil with rich natural gas to produce fat absorption oil containing natural gasoline constituents and fixed gases in solution, heating said fat oil by indirect heat exchange with hot lean absorption oil, vaporizing and separating fixed gases from said heated oil, introducing fat oil from which fixed gases have thus been removed into a vaporizing zone in a fractionating column to vaporize and separate natural gasoline constituents, withdrawing and heating partially denuded oil from which a portion of the natural gasoline constituents have been removed, by direct firing in a still, introducing said heated partially denuded oil into a stripping zone to remove additional natural gasoline constituents and to produce a hot lean absorption oil, withdrawing said hot lean absorption oil, passing a portion of said hot lean oil in the first mentioned indirect heat exchange with the said cool fat oil, passing another portion of said hot lean oil in direct heat exchange with water to form steam and returning said portion of lean oil and steam to said stripping column, passing still another portion of said hot lean oil to a second stripping column to vaporize and recondition same, and passing still another portion of said hot lean oil in indirect heat exchange with the last mentioned portion of lean oil passing to the stripping column to supply the latent heat of vaporization of the same.

EDWARD G. RAGATZ.
DONALD E. McFADDIN.